Dec. 17, 1968  M. F. RICE  3,416,832
AUTOMATIC COUPLING
Filed Sept. 15, 1967  5 Sheets-Sheet 1
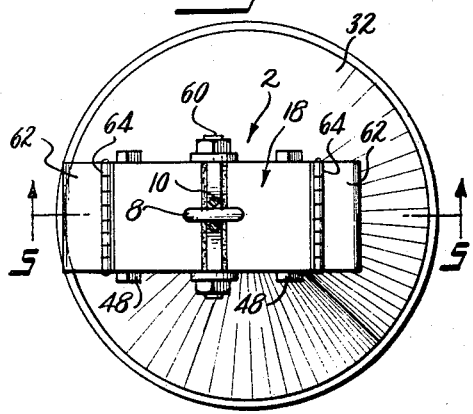
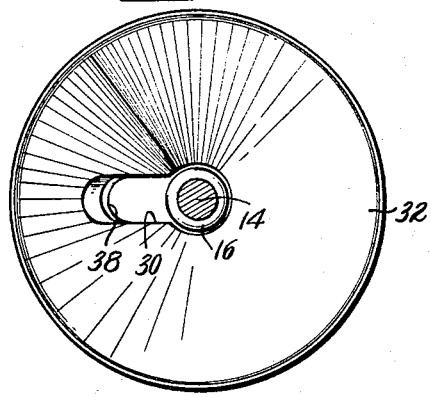
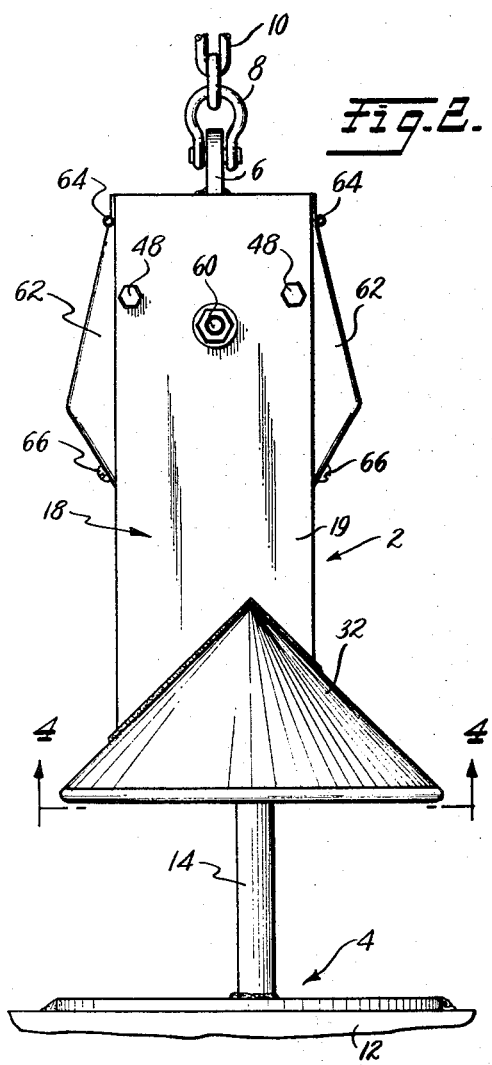
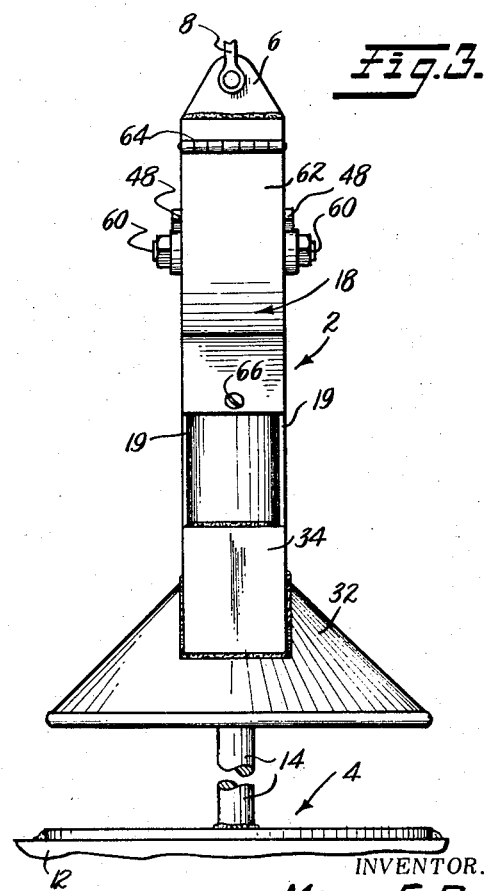
INVENTOR.
MATT F. RICE
BY
Bacon & Thomas
ATTORNEYS

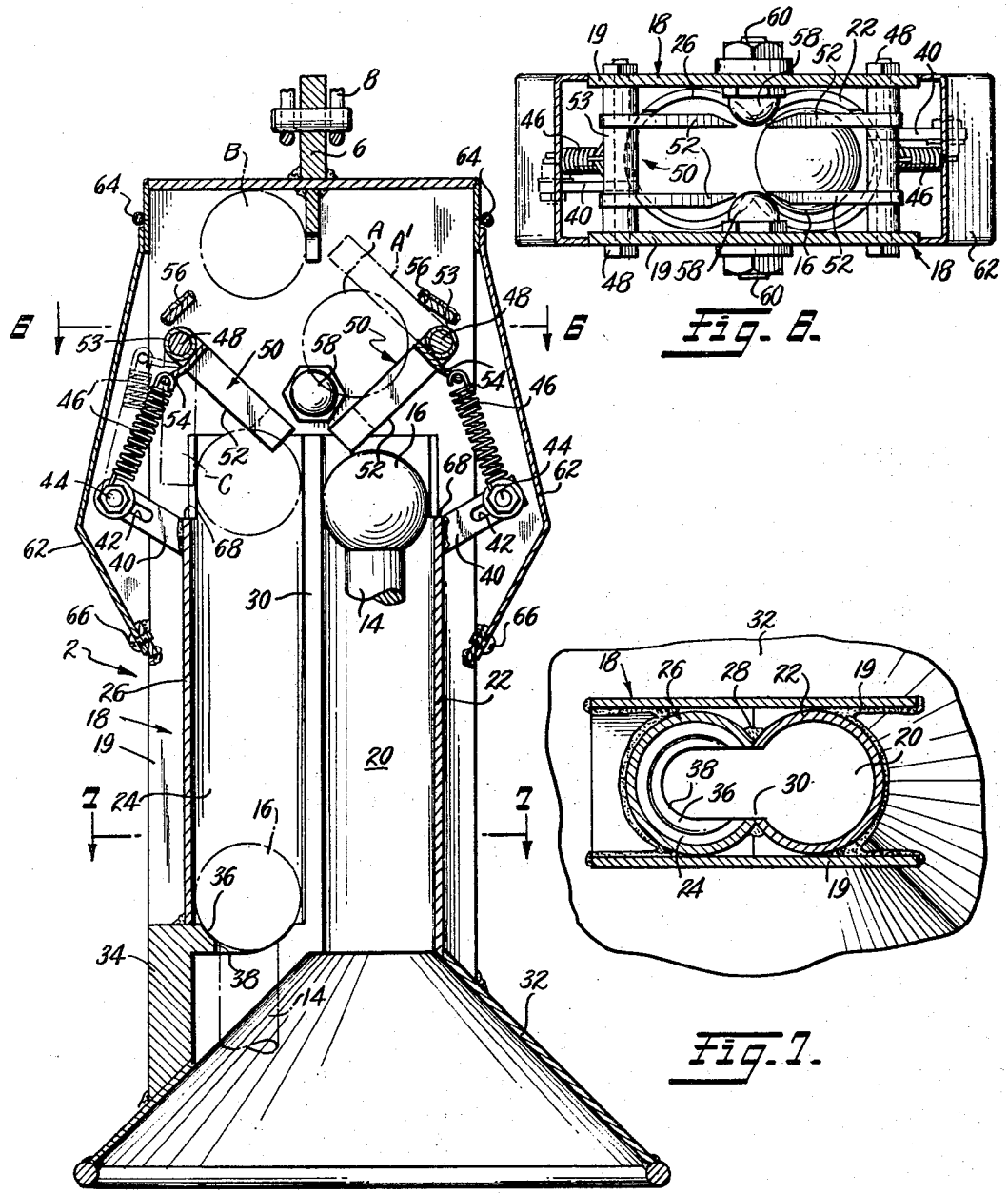

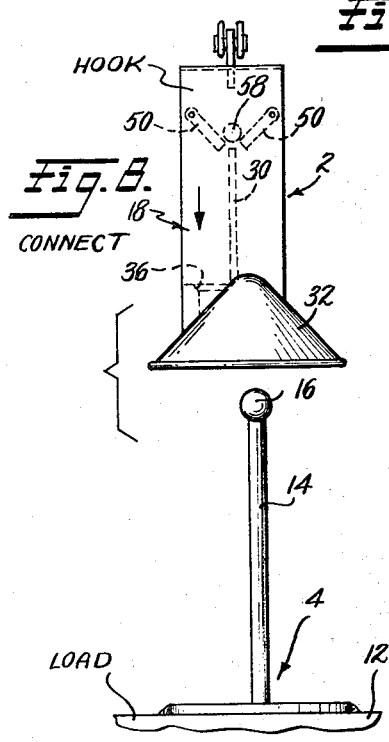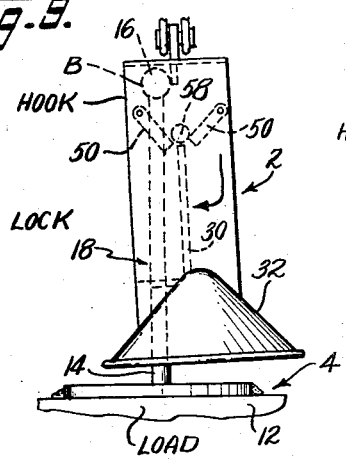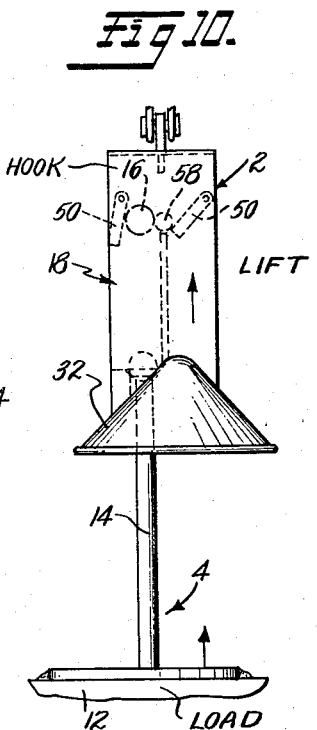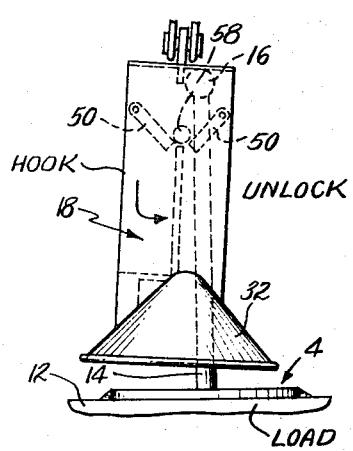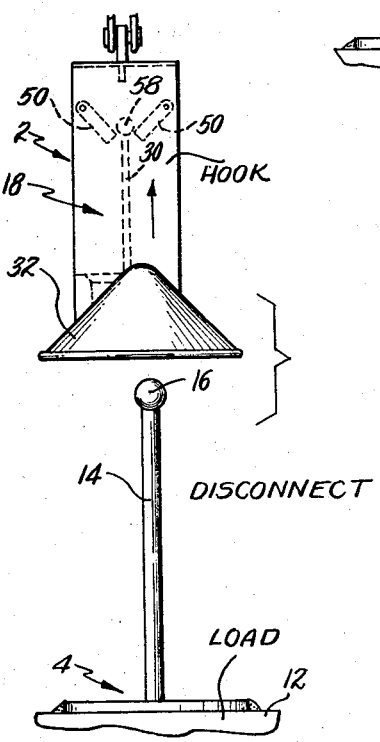

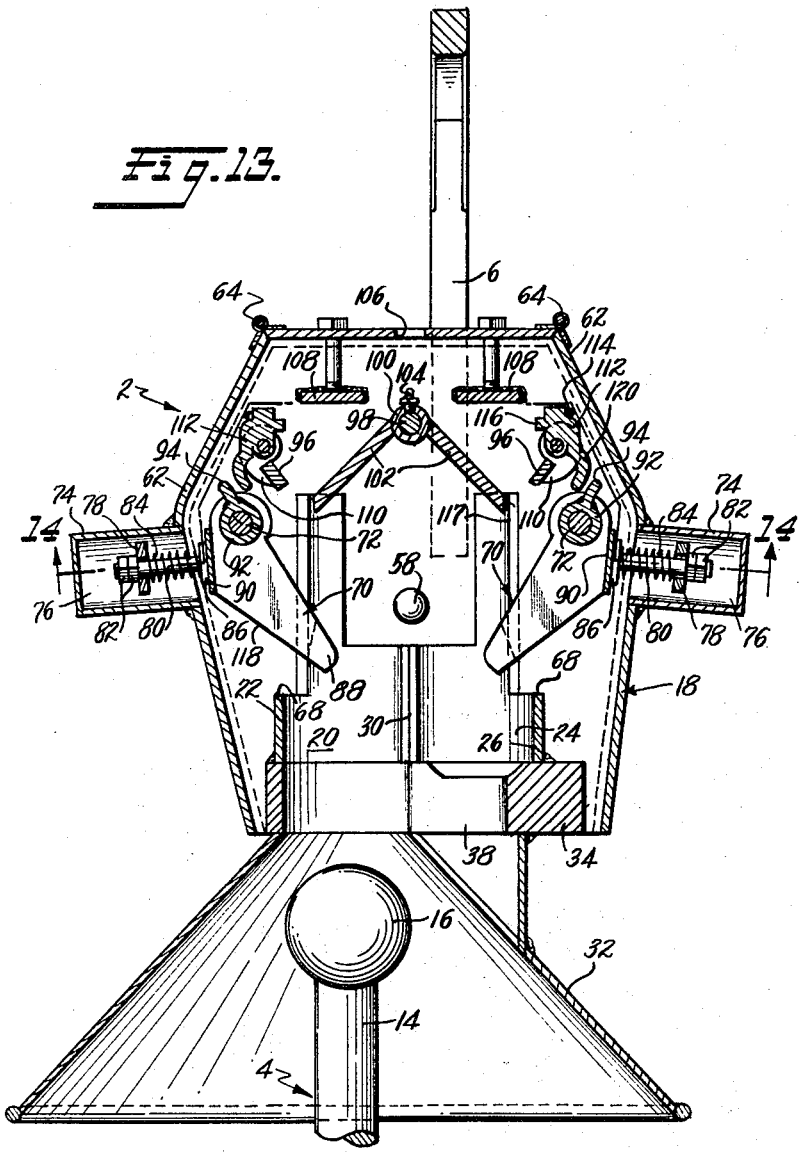
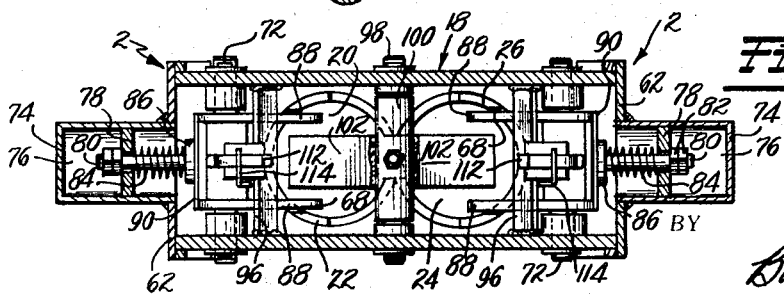

Dec. 17, 1968   M. F. RICE   3,416,832
AUTOMATIC COUPLING
Filed Sept. 15, 1967   5 Sheets-Sheet 5
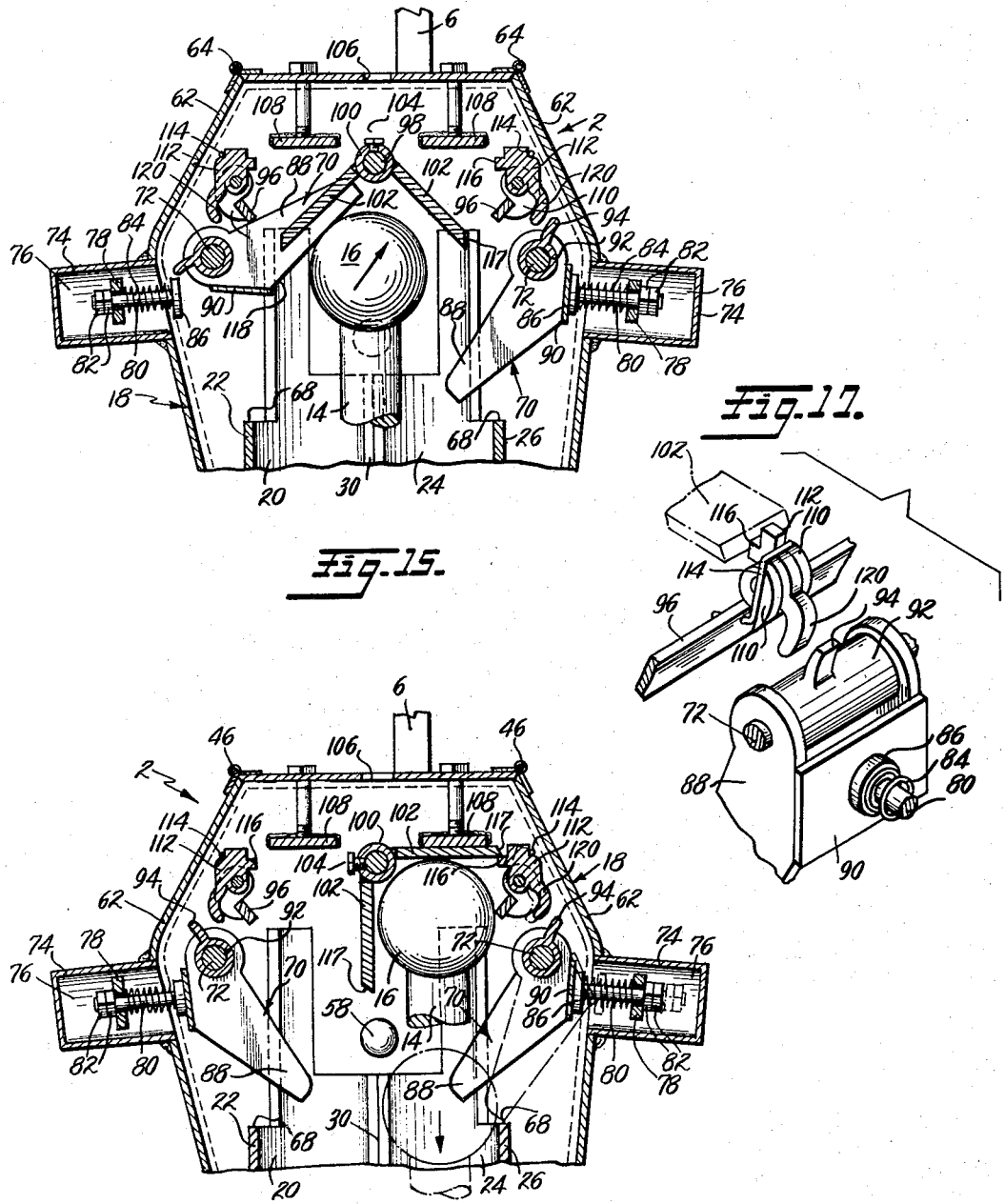
INVENTOR.
MATT F. RICE
BY
Bacon & Thomas
ATTORNEYS United States Patent Office 3,416,832
Patented Dec. 17, 1968

3,416,832
AUTOMATIC COUPLING
Matt F. Rice, Boise, Idaho, assignor to Morrison-Knudsen Company, Inc., Boise, Idaho, a corporation of Delaware
Filed Sept. 15, 1967, Ser. No. 668,125
15 Claims. (Cl. 294—82)

ABSTRACT OF THE DISCLOSURE

A load member has an upstanding rod with a spherical head at its upper end and a hook portion has a conical guide recess leading to a first upwardly extending passage therein. As the hook portion is lowered onto the load member the head moves up the first passage, through its upper end and engages and swings a spring-biased gate to one side. The gate deflects the head laterally to a position over a downwardly extending second passage leading to a seat for the head. By then lifting the hook portion, the seat engages the head and the load is lifted. When the hook and load are lowered and the load is deposited, the hook portion continues downwardly and the head moves through the upper end of the second passage where it engages and swings a second similar spring-biased gate which deflects the head laterally to a position over the first passage and the hook portion can then be lifted and separated from the load. A slot between the passages permits free lateral movement of the rod from one to the other.

Background of the invention

This invention relates to automatic coupling devices, particularly for use with hoisting equipment whereby alternate lifting and lowering movements of a hook portion alternately engage and release a load portion.

Automatic couplings of this general type are known in the prior art but applicant considers that the known prior devices are subject to certain disadvantages. For example, the patents to Hollick 1,425,525, Gellert 1,506,827 and Lee et al. 3,175,854 are of the type wherein alternate lifting and lowering of a so-called hook portion automatically and alternately engages and releases a load portion. However, at each step of the operation the load and hook portions must rotate relative to each other about a vertical axis. In many installations this is objectionable and imparts undesirable motions to the load after it has been lifted. Furthermore, the construction of the cylindrical shaped cam surfaces employed involves a relatively expensive and time-consuming manufacturing process.

Another type of known automatic coupling is exhibited in the patents to Mescher et al. 2,954,997, Hoover, 3,109,-677, and Dailey et al. 3,240,520. In the type of coupling exhibited by these patents, a lifting member is lowered onto a load device and causes movement of a trigger or release mechanism which causes a detent or latch on one to interlock with the other and the next cycle of operation causes release of the latch. However, many moving parts are involved and the entire load is carried by the movable or releasable latch elements, which are subject to failure and undue wear.

Summary of the invention

The invention herein provides for automatic coupling and de-coupling by mere relative motion between the hook and load portions of a coupling assembly without imparting rotary motion to either part of the coupling and wherein the load is sustained when lifted by a solid and nonmovable portion of the hook member.

In general, the hook member comprises a conical guiding device leading to an upwardly extending passageway therein. The load member includes an upstanding rod having a head at its upper end which head is engaged by the guide cone and guided into the vertical passageway. A second passageway is provided adjacent the first one and the two are connected by a longitudinal slot of sufficient with to pass the rod of the load member but too narrow to pass the head. As the hook is lowered onto the load member the head of the latter moves upwardly in the first passage through its open upper end and engages a resiliently biased gate and swings the same laterally to a stop position where it causes the head and hook member to move laterally relative to each other to position the head over the open upper end of the second passageway. During this lateral movement the rod of the load member moves through the slot. When the hook member is then lifted, the head moves downwardly in the second passageway to where it engages a rigid integral seat therein and the members of the coupling are then engaged so that the load may be lifted by the hook. When the load is then lowered onto a supporting surface and the hook member continues downwardly, the head moves up off its seat and out of the open upper end of the second passageway where it engages a second resiliently biased gate which deflects it laterally to a position over the first passageway and then upward movement of the hook portion results in separation of the parts.

Brief description of the drawings

FIG. 1 is a top plan view of the coupling of the present invention;
FIG. 2 is a side elevational view of the coupling of FIG. 1;
FIG. 3 is an end elevational view as seen from the left side of FIG. 2;
FIG. 4 is a bottom view partly in section taken on the line 4—4 of FIG. 2;
FIG. 5 is an enlarged vertical sectional view taken on the line 5—5 of FIG. 1;
FIG. 6 is a horizontal sectional view taken on the line 6—6 of FIG. 5;
FIG. 7 is a fragmentary horizontal sectional view taken on the line 7—7 of FIG. 5;
FIGS. 8 through 12 are diagrammatic views showing the sequence of steps in the operation of the coupling;
FIG. 13 is a vertical sectional view, similar to FIG. 5, but illustrating a second embodiment of the invention;
FIG. 14 is a horizontal sectional view taken on the line 4—4 of FIG. 13;
FIGS. 15 and 16 are fragmentary sectional views similar to FIG. 13 but showing the parts in relatively different positions; and
FIG. 17 is a perspective view of a latch and latch release mechanism.

Description of the preferred embodiment

Referring now to the drawings, and particularly FIGS. 5 and 6. The automatic coupling comprises a hook portion designated generally at 2 and a load portion designated generally at 4 (FIGS. 2 and 3). The so-called hook portion is provided with an upper bracket 6 rigid therewith to which a clevis or the like 8 is pivoted. The clevis 8 is shown as engaging a hoisting chain 10 extending upwardly to any suitable hoisting or lifting equipment. The load itself is indicated at 12 and may be any load to be lifted and/or transported by the hoisting equipment. Let it be assumed for purpose of this description, that the load 12 is a container of concrete to be filled at one location, then lifted and swung to another position where it will be lowered and released. Secured to the load in any suitable manner, such as by welding, is an upstanding steel rod 14 on the upper end of which a spherical head or ball 16 is secured (see FIG. 5). As is obvious, the spherical head 16 is of greater diameter than the rod 14.

The hook portion of the coupling comprises a housing 18, defined principally by spaced plates 19, and having therein means defining a first cylindrical tubular passageway 20 within a C-shaped tube 22 and a second cylindrical passageway 24 within a second C-shaped tubular member 26. The open sides of the tubular members 22 and 26 face each other and are suitably welded as at 28 or otherwise secured to form a rigid structure and the pair of tubes are welded or otherwise securely fixed within the housing 18. As shown, the housing 18 is generally rectangular in shape. The open sides of the C-shaped tubes 22 and 26 define a longitudinal slot 30 connecting the interiors of the two passageways 20 and 24 and as is shown, the width of the slot is greater than the diameter of the rod 14 but is less than the diameter of the ball 16.

The passageway 20 is open at both its top and bottom ends and the housing 18 includes a conical guide portion 32 rigid therewith and converging upwardly toward the open lower end of the passageway 22. The housing 18 includes a seat structure 34 rigidly secured at the lower end of the tube defining the second passageway 24 and is formed to define a generally C-shaped spherical seat 36 with its open side coinciding with the slot 30. The seat 36 is of such diameter and shape that its central opening 38 can freely receive the rod 14 and the seat portion 36 will engage and support the spherical head 16, as shown by dotted line in FIG. 5.

Near their upper ends, each of the tubes 22 and 26 is provided with a rigid outwardly extending bracket 40 thereon having a slot 42 therein and along which an anchor bolt 44 may be selectively positioned and by means of which one end of a tension spring 46, having one end engaging bolt 44, may be adjusted laterally. Pivotally mounted between the side plates of the housing 18, on suitable pins 48, are gates 50. Each gate 50 comprises a pair of parallel arms 52 (see FIG. 6) rigidly connected together by hub means 53 whereby they may pivotally swing about pin 48 in unison. Rigidly connected to the hub of each gate 50 is a laterally extending bracket or arm 54 to the outer end of which the other end of tension spring 46 is secured. As is obvious, tension in the springs 46 will tend to bring the axis of pin 48, the outer end of arm 54 and bolt 44 into alignment and in which state the arms 52 of gates 50 extend downwardly and inwardly overlying the open upper ends of the passageways 20 and 24. The arms 52 are spaced apart but are close enough together so that the distance therebetween is less than the diameter of the spherical head 16. It will be apparent that the arms 52 may swing about their pivot pin 48 either clockwise or counterclockwise and then when released will return to the normal position described and shown in full lines in FIG. 5. The space within the housing 18 above the open ends of the channels 22 and 24 actually defines a chamber in which the gates are located. Above each pivot pin 48 is a rigid stop member 56 fixedly secured within the housing 18 and serving as a stop to limit upward and outward swinging movement of the gates 50 to about the position shown in dotted line in the upper portion of FIG. 5.

On the inner surface of the side wall plates 19 of housing 18 and immediately above the upper end of slot 30 is a pair of generally spherical opposed abutments 58. The abutments 58, as shown, may comprise head portions of bolts 60 mounted in the side walls of the housing 18. The minimum spacing between the inner surfaces of the abutments 58 is less than the diameter of the ball 16 but is greater than the diameter of the rod 14. As shown in FIG. 6, the outer ends of the arms 52 are bevelled to provide clearance whereby they may swing freely past the abutments 58.

As shown, the housing 18 is also provided with hinged closure means 62 hinged to the housing 18 at 64 and releasably held in closed position by suitable screws 66. The closures 62 provide for access to the chamber housing the gates 50 and abutments 58 for inspection or for adjustments of the bolts 44 along slots 42 to thereby change the normal positions of the gates 50 as and if required.

In operation, assume that the load 12 is resting on a supporting surface and it is desired to lift the same by the hoisting equipment, transport it to a different location and deposit the same at the new location. The hoisting equipment is manipulated to position the hook portion 2 generally over the rod 12, as schematically indicated in FIG. 8. The hook portion is then lowered so that the conical guide 32 engages the ball 16 on the load portion and guides the same into the lower end of passageway 22. Continued lowering of the hook portion will cause the ball 16 to move upwardly through the open upper end of passageway 22 to the position indicated by dotted line A of FIG. 5 and it will swing the gate 50 to the dotted line position A' of FIG. 5. At this time the spring 46 applies a substantial bias to the gate 50 and its engagement with the ball 16 applies a lateral force to that ball tending to push it to the left, as seen in FIG. 5. Also, since the gate is arrested by stop 56, it functions as a cam serving to deflect the ball 16 to the left. Continued downward movement of the hook portion will push the ball 16 up high enough so that gate 50 will deflect the ball upwardly and laterally to the dotted line position shown at B in FIG. 5. This position of the ball is also shown schematically in FIG. 9 wherein it is seen that the previously deflected gate 50 has now returned to its normal position and the gate 50 over the second passageway 24 remains in its normal position. It will be remembered that movement of the ball 16 from the position A to the position B of FIG. 5 results in the rod 14 passing between the abutments 58 and freely through the slot 30.

FIG. 9 indicates the lowermost position of the hook portion 2 and when it reaches that position, the hook portion is then lifted relative to the load and the parts assume the position shown by the upper dotted lines in FIG. 10. As will be obvious, downward movement of the ball 16 from position B will cause it to engage the left hand side of the abutments 58 and also to engage the upper surface of the left hand gate 50. However, since the gates 50 are freely swingable downwardly, against the bias of springs 46, the left hand gate 50 will merely be swung downwardly out of the way and the ball 16 will engage the abutments 58 and be cammed or guided thereby into the open upper end of second passageway 24. The outer sides of tubes 22 and 26 are provided with clearance notches 68 to permit downward swinging of gates 50 to the dotted line position C of FIG. 5. After the ball 16 moves downwardly in the passageway 24 past the end of the gate in position C, the left hand gate 50 is released and it swings back to its normal position under the influence of its spring 46. The hook portion 2 is then lifted upwardly until the ball 16 engages seat 36 whereupon the hook portion and the load portion are connected and the load may be lifted and manipulated by the hook portion in an obvious manner. When it is desired to release the load from the hook, it is only necessary to manipulate the hoisting equipment to lower the assembly until the load rests on a suitable supporting surface and to continue downward movement of the hook portion, then reversal thereof and lifting of the same will result in disconnecting the hook portion from the load in exactly the same manner as already described for the coupling cycle. FIGS. 11 and 12 schematically illustrate the unhooking sequence, which will be obvious to those skilled in the art.

In the embodiment shown in FIGS. 13 to 17, many parts are identical or substantially identical to corresponding parts in FIGS. 1 to 12 and are identified by the same reference numerals. Those parts will not be described in detail again.

In FIG. 13, the gates 70, correspondingly generally to the gates 50 of FIG. 5, are pendulously pivoted on shafts 72 so that they fall by gravity to the position illustrated. The closure members 62 are provided with housing protuberances 74 defining auxiliary chambers 76. A strut 78 extends across the interior of each chamber 76 and is provided with a guide opening for a rod 80. At its outer end each guide rod 80 is provided with lock nuts or other suitable stop means 82 to limit its inward movement and a spring 84 between the strut 78 and a head 86 at the inner end of each rod 80 urges those rods to slide inwardly to the inner positions shown in FIG. 13. The spaced legs 88 of the gates 70 are spanned by plates 90 affixed thereto and in position to abut the heads 86 and to be held thereagainst by the action of gravity on the pendulous gates. The hub portions 92 of the gates 70 are each provided with a projection 94 (see also FIG. 17) constituting a latch releasing element to be described in more detail later.

Extending across the interior of the housing 18 is a pair of abutments or stop members 96, one above each gate 70, corresponding generally to the members 56 of FIG. 5 and against which the gates 70 are adapted to abut, as shown in FIG. 15.

Directly above the previously described slot 30 a fixed shaft 98 is mounted and on which a tubular hub member 100 is freely journalled. Welded or otherwise rigidly affixed to the hub 100 is a pair of downwardly divergent arms 102, which with the hub 100 define a pendulous blocking means. As shown, the arms 102 are sufficiently narrow to pass freely between the legs 88 of gates 70 and are arranged at approximately right angles to each other so that the blocking means will normally assume the position shown in FIG. 13 wherein the arms 102 diverge downwardly and outwardly to overlie the open upper ends of passageways 20 and 24 in the path of movement of the enlargment 16 on the load member. A grease fitting 104 is provided to facilitate lubrication of the sleeve 100 and is rendered accessible by opening 106 in the top wall of housing 18. Fixed abutment or stop members 108 are positioned to engage an arm 102 when the pendulous locking means is swung to one side or the other to limit such rotation of the blocking means to positions wherein one or the other of the arms 102 is substantially vertical and in general alignment with the slot 30, as shown in FIG. 16 and which will be referred to later.

Welded or otherwise fixed to each of the abutments or stop members 96 is a pair of brackets 110 (see also FIG. 17) between which a latch element 112 is pivoted. A suitable spring 114 urges the latch element 112 to pivot in a direction to project its upper end inwardly toward the center of the housing 18. Each latch element is provided with a nose portion 116 adapted to engage under the outer end of a respective blocking means arm 102 when the latter is swung to the position shown in FIG. 16.

In operation, the hook portion 2 is lowered relative to the load portion 4 in such manner that the guide cone 32 directs the ball 16 into the lower open end of passageway 20 and continued downward movement of the hook portion causes the arms of the corresponding gates 70 to engage the ball 16 and to be swung upwardly thereby until the gate 70 engages the stop abutment 96, as shown in FIG. 15. During this upward swinging movement of the gates 70, the plate 90 pulls away from the springpressed head 86 and thus no spring bias is applied to the gates during such upward movement. When the gate 70 is stopped by the abutment 96, its lower edge surfaces 118 (FIG. 15) constitute cam surfaces to forcibly deflect the ball 16 laterally toward the other passageway 24 and during such lateral movement the ball 16 moves upwardly and inwardly to a position where it is embraced by the legs 102 of the blocking means. Continued movement of the hook portion downwardly causes the ball 16 to move farther upwardly and to the right, as seen in FIG. 15, and to the upper position shown in FIG. 16 wherein one of the arms 102 engages its corresponding stop 108 after having passed the nose 116 of latch element 112 by camming the same outwardly with its bevelled end 117. The latch thus holds the blocking means in the position shown in FIG. 16. Upon subsequent lifting of the hook portion 2, the vertically extending arm 102 of the blocking means constitutes a positive block against return of ball 16 toward passageway 20 and enforces its movement downwardly toward passageway 24. Engagement of the ball 16 with projections 58 (as already described with reference to the first embodiment) completes the guidance of the ball 16 into the upper end of passageway 24. Continued upward movement of the hook portion causes relative downward movement of the ball 16 in passageway 24 during which the ball engages the gate 70 associated with passageway 24 and forces the same to the position shown in dotted lines in FIG. 16 wherein the spring 84 is partially compressed, thus providing a resilient bias on the gate. After the ball 16 passes the lower end of gate 70, the latter is swung inwardly to the full line position by the spring 84 and is retained therein for later operation by the action of gravity on the legs 88.

During outward swinging movement of gate 70, the latch releasing projection 94 thereon engages a depending finger 120 on the latch 112 and retracts the latch from arm 102, against the action of spring 114, to release the pendulous blocking means to the action of gravity, whereupon the parts return to the normal position shown in FIG. 13. Continued upward movement of the hook member causes the ball 16 to engage the seat 36, as previously described, whereupon the load can be lifted and transported. Since the parts are duplicated on both sides of the hook portion, the sequence of operation in disconnecting the hook from the load is exactly the reverse of those just described and will be obvious to those skilled in the art.

The apparatus shown and described herein is capable of connecting extremely heavy loads to a suitable lifting device and, in some instances, the hook portion may be as heavy as 500 pounds or more. Since the described operations, of both embodiments, essentially entail lateral movement of the hook portion itself, substantial inertia forces are developed. The embodiment shown in FIGS. 1 through 12 is adequate and operates dependably for relatively light loads but for heavier equipment, inertia forces can be developed such that the ball 16 tends to return into the passageway that it has just left, thus, in some instances, defeating the intended mode of operation. However, with the pivoted blocking means incorporated in the second embodiment, proper connection and release of the load each and every time the device is operated as described is assured.

The foregoing descriptions of operation suggest that only the load portion 4 moves laterally during connection and release. However, this form of description is only for convenience and should be viewed as describing relative motions between the hook and load portions. The rod 14 need not, however, be rigid or rigidly mounted on the load 12. It could as well be any articulated tension member capable of supporting the head 16 for the described operations. Also, the portion referred to as the hook portion of at least FIGS. 1–12 could be secured to the load and the head 16 carried by hoist chain 10 or its equivalent. Such reversal of the parts would not change the described operations wherein the head 16 is caused to move through a generally U-shaped path.

I claim:

1. An automatic coupling having a first portion and a second portion; said second portion comprising an elongated tension member having an enlarged head at one end; said first portion having an entry opening for receiving said head, a seat adjacent said opening for engaging and supporting said head, and guide means for guiding said head along a generally U-shaped path between said opening and said seat; said guide means including displaceable deflecting means adjacent the bight portion of said path and engageable by said head as it moves along one leg of said path toward said bight portion, said deflecting means being arranged to be laterally deflected by said head and to a position to deflect said head to move through said bight portion to the other leg of said path.

2. A coupling as defined in claim 1 wherein said seat is generally C-shaped, said guide means defining a slot between said legs of said path and communicating with the central portion of said seat whereby said elongated tension member may pass freely therethrough from one leg to the other and to and from the central portion of said seat.

3. A coupling as defined in claim 1 including a guide element for guiding said head into said entry opening.

4. A coupling as defined in claim 1 wherein said guide means includes means at said bight portion of said path and engageable by said head after deflection thereof for positively guiding said head into said other leg of said path.

5. An automatic coupling having a hook portion and a load portion; said load portion comprising an upstanding rod having an enlargement at its upper end; said hook portion having means defining a pair of adjacent generally parallel passageways of a size to freely pass said enlargement, said passageways both being open at their upper ends, the first being open at its lower end, the second having upwardly facing seat means at its lower end to engage and support said enlargement; a longitudinal slot between said passageways, of a size to freely pass said rod from one passageway to the other but too narrow to pass said enlargement; and deflectable means adjacent the open upper ends of said passageways and arranged to engage said enlargement as it moves upwardly through the open upper end of either passageway and deflect the same laterally to a position generally over the open upper end of the other passageway.

6. A coupling as defined in claim 5 including downwardly flaring guide means for guiding said enlargement upwardly into the open lower end of said first passageway.

7. A coupling as defined in claim 5 including opposed abutments fixed relative to said passageways adjacent the upper ends of said passageways on opposite sides of said slot, the distance between said abutments being less than the corresponding dimension of said enlargement and greater than that of said rod; and cooperating camming surfaces on said enlargement and abutments to guide said enlargement into the upper end of said other passageway after deflection thereof by said resilient means.

8. A coupling as defined in claim 5 wherein said resiliently deflectable means comprises a pair of pivoted gates, there being a gate pivoted on an axis, lying generally over the outer edge of each passageway, each gate being resiliently biased to normally extend downwardly and inwardly over the open upper end of its corresponding passageway and being yieldably swingable upwardly and outwardly when the enlargement moves upwardly from its corresponding passageway and being yieldably swingable downwardly and outwardly when the enlargement moves downwardly into the open upper end of its corresponding passageway.

9. A coupling as defined in claim 8 including opposed abutments fixed relative to said passageways adjacent the inner ends of said gates when said gates are in their normal position, said abutments being on opposite sides of the upper end of said slot, the distance between said abutment being less than the corresponding dimension of said enlargement and greater than that of said rod; and cooperating camming surfaces on said enlargement and abutments to guide said enlargement into the upper end of said other passageway after deflection thereof by one of said gates.

10. A coupling as defined in claim 9 wherein said enlargement is a spherical head on the upper end of said rod and wherein said abutments are substantially hemispherical.

11. A coupling as defined in claim 9 including a housing fixed to said passageways and defining a chamber enclosing the open upper ends of said passageways; said abutments and said gates being mounted within said chamber.

12. An automatic coupling having a hook portion and a load portion; said load portion comprising an upstanding rod having an enlargement at its upper end; said hook portion having means defining a pair of adjacent generally parallel passageways of a size to freely pass said enlargement, said passageways both being open at their upper ends, the first being open at its lower end, the second having upwardly facing seat means at its lower end to engage and support said enlargement; a longitudinal slot between said passageways, of a size to freely pass said rod from one passageway to the other but too narrow to pass said enlargement; movable means adjacent the open upper ends of said passageways and arranged to engage said enlargement as it moves upwardly through the open upper end of either one of said passageways to be moved thereby to a position wherein it deflects the enlargement laterally to a position generally over the open upper end of the other passageway; blocking means, responsive to movement of said enlargement laterally to alignment with the other passageway, for blocking movement of said enlargement back to said one passageway; and release means responsive to movement of said enlargement along said other passageway for releasing said blocking means.

13. A coupling as defined in claim 12 wherein said movable means comprises a pair of pendulously pivoted gates, there being a gate pivoted on an axis, lying generally over the outer edge of each passageway, and yieldable stop means holding each gate in position to normally extend downwardly and inwardly over the open upper end of its corresponding passageway while being freely swingable upwardly when the enlargement moves upwardly from its corresponding passageway and being yieldably swingable downwardly and outwardly when the enlargement moves downwardly into the open upper end of its corresponding passageway; stop means limiting the upward swinging movement of each gate to a position wherein it extends upwardly and inwardly to thereby deflect said enlargement toward the adjacent passageway.

14. A coupling as defined in claim 12 wherein said blocking means comprises a pendulous member having a pair of arms normally diverging downwardly and outwardly, respectively over the open upper ends of said passageways and arranged to embrace said enlargement and to be swung laterally thereby; and latch means for holding said pendulous member in its laterally swung position wherein one of said arms blocks return of said enlargement toward said one passageway.

15. A coupling as defined in claim 14 wherein said release means is responsive to downward swinging movement of the gate of said other passageway for releasing said latch.

References Cited
UNITED STATES PATENTS

| 3,167,345 | 1/1965 | Dukes | 294—83 |
| 3,199,911 | 8/1965 | Alliot et al. | 294—95 |
| 3,261,637 | 7/1966 | Bopp et al. | 294—81 |

ANDRES H. NIELSEN, *Primary Examiner.*

U.S. Cl. X.R.

294—83, 110